United States Patent Office 3,373,147
Patented Mar. 12, 1968

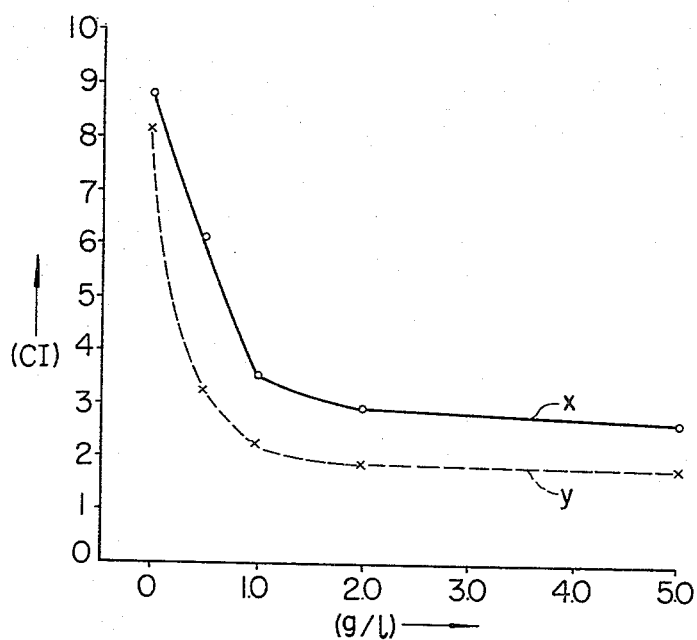

3,373,147
POLYMERIZATION OF ACRYLONITRILE IN DI-
METHYL SULFOXIDE SOLVENT USING AZO
CATALYST AND HYDROXYLAMINE SALT
COLOR INHIBITOR
Zenzi Izumi and Hideji Kitagawa, Masaki-machi, Japan,
assignors to Toyo Rayon Kabushiki Kaisha, Tokyo,
Japan, a corporation of Japan
Filed Oct. 15, 1964, Ser. No. 404,057
Claims priority, application Japan, Oct. 21, 1963,
38/55,875
6 Claims. (Cl. 260—85.5)

ABSTRACT OF THE DISCLOSURE

A process for that solution polymerization of acrylonitrile using dimethyl sulphoxide as the solvent and an azobis compound as the catalyst, the improvement comprises effecting the polymerization reaction in the presence of at least one hydroxylamine salt, also included within the scope of the invention is the combination of sulfuric acid with the hydroxylamine salt; as a result of the incorporation of at least one hydroxylamine salt alone or in combination with sulfuric acid in the reaction mixture, a remarkable coloration-inhibiting effect is provided. The solution polymerization product obtained in accordance with the process can be used as a spinning solution, from which spinning solution may be manufactured acrylic fibers having an excellent degree of whiteness.

This invention relates to improvements in the process for preparing polyacrylonitrile or acrylonitrile copolymers by solution polymerization, and particularly relates to a solution polymerization process in which the polymerization reaction is carried out in the presence of hydroxylamine salts, preferably in the presence also of sulphuric acid.

It is known that as a method of obtaining acrylonitrile polymers, by which term is meant homopolymers and copolymers of acrylonitrile with other monomers, the solution polymerization process in which the polymerization is directly carried out in a solvent is a more simple and economical process than other polymerization processes. A particularly useful solution polymerization process for acrylonitrile polymers uses as a solvent dimethyl sulphoxide containing less than 5% by weight of water, and as the polymerization catalyst, an azobis compound, to provide a good velocity of reaction, yield and degree of polymerization. One of the defects that has been noted in such solution polymerization processes, however, is that the degree of coloration of the polymeric solution becomes excessive, resulting in the polymer obtained having a yellowish brown color. Although proposals have been made for carrying out the foregoing solution polymerization in the presence of various coloration inhibitors, fully satisfactory results have not been obtained, particularly in end products wherein even a slight deterioration in the degree of coloration is unacceptable, such as, for example, fibres and films.

It has now been found that in solution polymerization processes for acrylonitrile by using a specified combination of known reaction solvents and catalysts the incorporation of hydroxylamine salts in the reaction mixture provides remarkable coloration inhibiting effects, and that the conjoint use of sulphuric acid with such salts provides a still further improvement. The benefits of the invention are not manifested when dimethyl sulphoxide was not used as the reaction medium, or when known catalysts other than azobis compounds are used.

The invention consists in a process for solution polymerizing acrylonitrile using dimethyl sulphoxide as the solvent and an azobis compound as the catalyst, the improvement which comprises effecting the polymerization reaction in the presence of at least one hydroxylamine salt.

In addition, it has been found that by using the aforesaid hydroxylamine salts or a combination of the salts and sulphuric acid in amounts within a specified range, based on the volume of the reaction system, especially good results are to be obtained.

A preferred feature of the invention is provided by the compound with such a medium containing less than about 5% of water, which is usually employed commercially.

The solution polymerization product obtained according to the process of the invention can be used, as such, as a spinning solution, and from which spinning solution can be manufactured acrylic fibres of exceedingly excellent degree of whiteness.

Copolymerizable monomers which may be copolymerized with acrylonitrile include for example, acrylic acid, methacrylic acid, acrylic acid esters, methacrylic acid esters, acrylamide, methacrylamide or the monoalkyl substituent products thereof, styrene, vinyl chloride, vinylidene chloride, vinyl carboxylates such as vinyl acetate, vinyl chloroacetate, and vinyl benzoate, the alkyl substituent products of vinyl pyridine such as 2-vinyl pyridine and 2-methyl-5-vinyl pyridine, and alkenyl aromatic sulphonic acid, vinyl sulphonic acid, allyl sulphonic acid, methallyl sulphonic acid and the salts thereof.

It is an indispensable condition according to this invention to use dimethyl sulphoxide as the solvent and an azobis compound as the catalyst. This is due to the fact that the effectiveness of the coloration inhibitor varies according to the solvent and catalyst used in carrying out the polymerization of acrylonitrile. For example, no improved effects are obtained even though amine salts are added during the preparation for dimethylsulfoxide solution of polyacrylonitrile obtained using an aqueous system. Further, even in the case of a solution polymerization reaction carried out in the presence of a hydroxylamine salt, with dimethyl sulphoxide as solvent, the polymerization reaction does not take place in those cases where, for example, ammonium persulphate has been used as catalyst.

The azobis compounds used according to the invention are represented by the general formula:

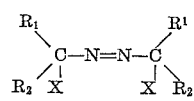

wherein $R_1$ and $R_2$ are alkyl or alkyl derivatives and X is a functional group such as nitrile or carboxylic acid derivatives.

In order to polymerize acrylonitrile or a mixture of at least 85 mol percent of acrylonitrile and other polymerizable unsaturated vinyl compounds according to the process of the invention, the reaction is normally carried out at a polymerization temperature of about 40–60° C. for about 20–40 hours by adding a suitable amount of the catalyst.

While dimethyl sulphoxide may be used alone as the polymerization solvent the use of dimethyl sulphoxide containing a small proportion of water as the solvent provides further improved coloration inhibiting effects. However, the water content of the dimethyl sulphoxide should not exceed 5% of water, otherwise a gel is formed. Therefore it is to be understood that the dimethyl sulphoxide as used herein, should not contain more than 5% by weight of water.

Further, it is preferred that the polymerization reaction be carried out according to the invention in the absence of oxygen, which has the effect of hindering the polymerization. For this purpose, a suitable inert gas such as nitrogen or carbon dioxide may be used for replacing the air. The polymerization reaction can be carried out in a continuous or batch manner according to known techniques.

Hydroxylamine salts that can be used in the invention process include hydroxylamine hydrochloride, hydroxylamine sulphate, hydroxylamine oxalate, hydroxylamine phosphate and hydroxylamine acetate. Also salt mixtures may be used, such as for example, the so-called amine solution used in the production of epsilon-caprolactam.

When the hydroxylamine salts are used alone, i.e. in the absence of sulphuric acid, although very excellent, there is a tendency to lower the polymerization velocity in the presence of oxygen or an oxygen-containing gas, for instance, air. Thus when the hydroxylamine salts are in the absence of sulphuric acid it is desirable that the polymerization is carried out completely under an inert atmosphere. On the other hand, when using the hydroxylamine salts together with sulphuric acid, the effects of the hydroxylamine salt are maintained and polymers having a good degree of whiteness are prepared in good yield without the accompaniment of a decrease in the rate of polymerization in the presence of a small amount of air.

When hydroxylamine salt or salts are used in the absence of sulphuric acid they may be present in the reaction mixture in proportions ranging from 0.3 g./l. to 5.0 g./l., and preferably from 0.5 g./l. to 2 g./l. based on the volume of the reaction mixture i.e. total volume of solution. On the other hand, when the hydroxylamine salt or salts are present together with sulphuric acid, it is particularly desirable that said salt or salts be present in the reaction mixture in proportions ranging from about 0.05 g./l. to 5.0 g./l., preferably 0.1 to 2 g./l., and the sulphuric acid present in a range of 0.01 g./l. to 1 g./l., based on the volume of the reaction mixture.

If the hydroxylamine salts are present in excess, when used in the absence of sulphuric acid they exhibit a chain transfer effect and the degree of polymerization of the resulting polymer decreases and further the rate of polymerization likewise decreases owing to the action of oxygen, which cannot be eliminated completely under practical conditions. On the other hand, when the hydroxylamine salts are associated with sulphuric acid no great difference in the coloration inhibiting effect is exhibited when the hydroxylamine salt is used in excessively large amounts.

The homopolymeric or copolymeric solution formed according to the invention can be processed to provide acrylonitrile fibres or other shaped articles of remarkably improved degree of whiteness, and which possess other superior physical properties.

The following examples of the invention and control experiments are provided.

Examples 1 and 2

In two solution polymerization reactions, the following solvents were used:

(A) Dimethyl sulphoxide.
(B) Dimethyl sulphoxide containing 3% water.

The solution polymerization reactions were carried out at 50° C. by adding 18.5 parts of acrylonitrile, 1.5 parts of methyl acrylate, 80 parts of solvent (either solvent A or B defined above) and 0.34 parts of azobisisobutyronitrile. Coloration inhibitors, namely hydroxylamine hydrochloride and sulphate according to the present invention, and conventional coloration inhibitors, namely oxalic acids, sulphuric acid and stannous oxalate, were incorporated into separate portions of the reaction mixture in proportions to yield a concentration of 1 g./l. therein. On heating the reaction mixtures for 25 hours, all attained a rate of polymerization of the order of 90%. The degrees of coloration, as represented by the color index, $$CI = \frac{\log T425 + \log T550 + \log T650}{3} \times 100$$

where $\log Ti$ = the transmittance at wavelength $im\mu$, where determined, and are shown in Table I.

TABLE I

| Experiment No. | Coloration Inhibitor | Solvent A (Dimethyl Sulphoxide alone) | Solvent B (Dimethyl Sulphoxide containing 3% water) |
|---|---|---|---|
| Control 1 | None | 11.0 | 9.5 |
| Control 2 | Oxalic acid | 4.5 | 4.0 |
| Control 3 | Sulphuric acid | 4.7 | 3.9 |
| Control 4 | Stannous oxalate | 4.1 | 5.0 |
| Example 1 | Hydroxylamine sulphate | 2.8 | 1.8 |
| Example 2 | Hydroxylamine hydrochloride | 2.5 | 1.4 |

It is apparent from the results of the foregoing that the effectiveness of the hydroxylamine salts in preventing the coloration of the polymeric solution is greater than any of the previously known inhibitors. The polymeric solutions obtained according to the invention were practically colorless, and acrylic fibres of an excellent degree of whiteness was obtainable therefrom.

Example 3

Using the polymerization conditions as in Example 1, except that the time of 30 hours was used, the relationship between the amount of hydroxylamine sulphate added and the color index of the resulting polymeric solution was investigated. The results obtained are shown in FIGURE 1, curve $x$ being the instance when solvent A was used and curve $y$, the instance when solvent B was used. On the vertical axis are shown the color indices (CI), while on the horizontal axis are shown the amounts (g./l.) of the hydroxylamine sulphate added. It is apparent from these results that the amount of the hydroxylamine salt added should be at least 0.3 g./l., and preferably at least 0.5 g./l., but that when added in proportions of more than 2 g./l., no increase in color inhibiting effect was obtained.

Example 4

Example 1 was repeated except that the methyl acrylate was not used, and 20 parts of acrylonitrile only were used. The color indices of the homopolymeric solutions in those cases in which a coloration inhibitor was not used and those cases when 1 g./l., of sulphuric acid, and 1 g./l. of hydroxylamine sulphate respectively, were added are shown below:

| Coloration Inhibitor | Solvent A | Solvent B |
|---|---|---|
| None | 11.5 | 9.8 |
| Sulphuric acid | 4.3 | 3.9 |
| Hydroxylamine sulphate | 2.9 | 1.8 |

Example 5

A mixture of 19 parts of acrylonitrile, 1.5 parts of methyl acrylate, 0.3 parts of sodium styrene sulphonate, 0.35 parts of azobisisobutyronitrile, 0.1 parts of hydroxylamine hydrochloride, and 80 parts of dimethyl sulphoxide as solvent were held for 30 hours at a temperature of 50° C. The degree of polymerization obtained was 93%, the viscosity of the polymeric solution at 42° C. was 250 poises, and the polymer was very clear, having a color index of 2.5. After removing the bubbles from the polymeric solution, it was spun from a spinneret having 7000 holes 0.08 mm. in diameter, into an aqueous 40% dimethyl sulphoxide solution of 30° C., at a discharge rate of 120 g. per minute, to form filamentary yarn. The filaments in the bath were transparent. These filaments were taken up at a take-up speed of 3 meters per minute after travelling through the bath for an immersion length of 3 meters. This undrawn yarn was immediately fed into an aqueous 6% dimethyl sulphoxide solution (temperature of 95° C.) where it was drawn 5× during an immersion length of 2 meters. This was followed by feeding this yarn into an aqueous 1% dimethyl sulphoxide solution where it was relaxed 17% during an immersion length of 2 meters, after which it was passed through room temperature water for 30 minutes to completely wash and remove any residual dimethyl sulphoxide. Thereafter, this yarn was dried for 5 minutes in a dryer and its water content reduced to less than 3%. No devitrification could be observed at all in the appearance of the so obtained fibre which had an excellent lustre and a very high degree of whiteness and was without cavities in its section. The physical properties of the fibre obtained were excellent, having a tenacity of 3.4 g./d., an elongation of 30% and a specific knotted strength of 86%. The degree of whiteness of this fibre, when represented by a rate of reflection at 480 m$\mu$, was 80%. The dyeability of this fibre was exceedingly good, the dye exhaustion of 5% Methylene Blue O.W.F. under conditions of 1 hour and 98° C., being 70%.

Examples 6 to 11

Dimethyl sulphoxide containing 1.0% water was used as the solvent of the solution polymerization at 50° C. of a reaction mixture consisting of 18.5 parts of acrylonitrile, 1.5 parts of methyl acrylate, 0.5 parts of sodium styrene sulphonate, 80 parts of the solvent and 0.34 parts of azobisisobutyronitrile. The reaction was carried out after adding 0.5 g./l. of hydroxylamine sulphate and sulphuric acid in the amount indicated in Table II. The rates of polymerization and the degree of coloration of the polymeric solutions 27 hours later or when air was present and under a vacuum of $10^{-4}$ mm. Hg were as shown in Table II.

TABLE II

| Experiment No. | Amount Added of Sulphuric Acid, g./l. | Small Amount of Air Present | | Air Completely Removed | |
|---|---|---|---|---|---|
| | | Color Index of Polymeric Solution, CI | Rate of Polymerization, percent | Color Index of Polymeric Solution, CI | Rate of Polymerization, percent |
| Control 5 | 0 | 2.1 | 83.5 | 1.9 | 91.0 |
| Example 6 | 0.005 | 2.3 | 86.0 | 1.8 | 91.8 |
| Example 7 | 0.01 | 2.2 | 91.5 | 2.0 | 92.0 |
| Example 8 | 0.1 | 2.3 | 91.7 | 2.1 | 93.0 |
| Example 9 | 0.5 | 2.4 | 92.0 | 2.3 | 92.8 |
| Example 10 | 1.0 | 2.4 | 92.3 | 2.4 | 92.5 |
| Example 11 | 2.0 | 2.5 | 92.1 | 2.4 | 92.8 |

As is apparent from the foregoing experiment, while the degree of coloration of the polymeric solution shows hardly any difference by the addition of a minute amount of sulphuric acid, the rate of polymerization rises, the rise being particularly notable in the case when air is present. Further, conjoint use of the hydroxylamine salts and sulphuric acid made in accordance with a preferred feature of the invention, is also demonstrated. All of the foregoing polymeric solutions yielded acrylic fibres of an excellent degree of whiteness.

Examples 12 to 17

Dimethyl sulphoxide containing 1% water was used as the solvent of the solution polymerization, carried out at 50° C. by adding 18.5 parts of acrylonitrile, 1.5 parts of methyl acrylate, 0.5 part of sodium styrene sulphonate, 80 parts of the solvent and 0.35 part of azobisisobutyronitrile, after adding 0.05 g./l. of sulphuric acid and hydroxylamine in the amounts indicated in Table III. The rates of polymerization and the degree of coloration of the polymeric solution 27 hours later when the reactions were carried out in the presence of air were as shown in Table III.

TABLE III

| Experiment No. | Amount Added of Hydroxylamine Sulphate, g./l. | Degree of Coloration of Polymeric Solution, CI | Rate of Polymerization, percent |
|---|---|---|---|
| Control 6 | 0 | 4.0 | 92.0 |
| Example 12 | 0.05 | 2.7 | 92.0 |
| Example 13 | 0.10 | 2.4 | 91.9 |
| Example 14 | 0.50 | 2.1 | 91.7 |
| Example 15 | 1.0 | 1.8 | 91.7 |
| Example 16 | 3.0 | 1.9 | 90.8 |
| Example 17 | 5.0 | 1.6 | 90.5 |

It is apparent from the foregoing experiment that if the hydroxylamine sulphate is present in an amount of at least 0.05 g./l., the degree of whiteness of the polymeric solution shows a notable improvement over the instance when sulphuric acid alone is present during polymerization and the rate of polymerization shows slight decreases as the added amount of the hydroxylamine sulphate increases, this difference is of no consequence up to an addition of the order of 3 g./l.

Example 18

In carrying out solution polymerization at 50° C. by adding 19 parts of acrylonitrile, 80 parts of dimethyl sulphoxide, 1 part of water and 0.4 part of azobisisobutyronitrile, the relationship between the amounts added of amine solution (a mixture of 15 parts hydroxylamine sulphate, 5 parts sulphuric acid, 20 parts ammonium sulphate and 40 parts water used in making $\epsilon$-caprolactam), and the degree of coloration of the polymeric solutions and rates of polymerization 30 hours later were as follows:

| Amount Added of Amine Solution g./l. | Degree of Coloration of Polymeric Solution, CI | Rate of Polymerization, percent |
|---|---|---|
| 0 | 10.1 | 92.0 |
| 0.5 | 2.6 | 92.0 |
| 1.0 | 2.0 | 91.7 |
| 2.0 | 1.5 | 91.5 |
| 5.0 | 1.4 | 90.5 |

When 1 g./l. of sulphuric acid was added the CI was 4.3. The degree of the coloration inhibiting effect when the amine solution was used is thus apparent, i.e., with conjoint use of hydroxylamine sulphate and sulphuric acid.

Example 19

In the solution polymerization at 50° C. of 18.5 parts of acrylonitrile and 1.5 parts of styrene in 80 parts of dimethyl sulphoxide, 1 part of water and 0.34 part of azobisisobutyronitrile, the reactions were carried out after adding 1.0 g./l. of hydroxylamine oxalate and sulphuric acid in the amounts listed below. The rates of polymerization and the degrees of coloration of the polymeric solutions 27 hours later when some air was present and when no air at all (deaired with a vacuum of $10^{-4}$ mm. Hg) was present were as follows:

| Amount Added of Sulphuric Acid, g./l. | Color Index of Polymeric Solution, CI | Rate of Polymerization, percent | Color Index of Polymeric Solution, CI | Rate of Polymerization, percent |
|---|---|---|---|---|
| 0 | 2.0 | 40.5 | 1.6 | 85.5 |
| 0.005 | 2.1 | 58.5 | 1.8 | 87.5 |
| 0.01 | 2.1 | 85.0 | 1.7 | 90.5 |
| 0.1 | 2.2 | 91.0 | 1.9 | 92.0 |
| 0.5 | 2.3 | 91.5 | 2.0 | 92.3 |
| 1.0 | 2.4 | 91.8 | 1.9 | 92.5 |
| 2.0 | 2.4 | 92.0 | 2.0 | 92.0 |

Example 20

To a mixture of 19 parts of acrylonitrile, 1.5 parts of methyl acrylate, 0.3 part of sodium methallylsulphonate and 0.1 part of sodium beta-styrene sulphonate in 80 parts of dimethyl sulphoxide containing 1 part of water and 0.3 part of azobisisobutyronitrile were added 0.03 part of hydroxylamine chloride and 0.01 part of sulphuric acid. The polymerization reaction was carried out for 24 hours in a 500 l. polymerization vessel at 55° C. in an atmosphere of nitrogen. The rate of polymerization was 93.5%, the viscosity of the polymeric solution at 45° C. was 190 poises, the polymerizate was very clear, having a color index of 2.4. The polymeric solution, after removal of bubbles contained therein, was spun from a spinneret having 7000 holes 0.08 mm. in diameter, into a 30° C. aqueous 38% dimethyl sulphoxide solution to form filamentary yarn. When the spun yarn was drawn, relaxed, washed with water and dried, a fibre was obtained in which no devitrification in its appearance could be observed, and which had excellent lustre and a high degree of whiteness. Its physical properties were superior, having a tenacity of 3.2 g./d., an elongation of 35% and a specific knotted strength of 80%. The degree of whiteness of this fibre, when represented by a reflectance at 400 m$\mu$, was 69% and hence very good. The dyeability of this fibre was excellent, its dye exhaustion of 5% Methylene Blue—O.W.F. at 1 hour and 98° C. was 76%.

What we claim is:

1. In a process for the solution polymerization of acrylonitrile wherein dimethyl sulphoxide is used as the solvent, containing not more than 5 percent by weight of water, and an azobis compound is used as the catalyst, the improvement which comprises adding to the reaction mixture at least one hydroxylamine salt and thereafter effecting the polymerization reaction, said hydroxylamine salt being present in the reaction mixture in an amount, based on the volume of said reaction mixture, ranging from 0.3 to 5.0 grams per liter.

2. The process according to claim 1 wherein said hydroxylamine salt is hydroxylamine hydrochloride, hydroxylamine sulphate, hydroxylamine oxalate, hydroxylamine phosphate or hydroxylamine acetate, or mixtures of two or more thereof.

3. The process of polymerizing acrylonitrile according to claim 1, in which acrylonitrile is copolymerized with up to 15 mol percent of a further copolymerizable vinyl compound, or mixture of such compounds.

4. In a process for the solution polymerization of acrylonitrile wherein dimethyl sulphoxide is used as the solvent, containing not more than 5 percent by weight of water, and an azobis compound is used as the catalyst, the improvement which comprises adding to the reaction mixture at least one hydroxylamine salt and sulfuric acid, said hydroxylamine salt and sulfuric acid being present in the reaction mixture in amounts ranging from 0.05 gram to 5.0 grams per liter and 0.01 gram to 1 gram per liter, respectively, based on the volume of the reaction mixture.

5. In a process for the solution polymerization of acrylonitrile wherein dimethyl sulphoxide is used as the solvent, containing not more than 5 percent by weight of water, and an azobis compound is used as the catalyst, the improvement which comprises adding to the reaction mixture at least one hydroxylamine salt and thereafter effecting the polymerization reaction, said hydroxylamine salt being present in the reaction mixture in an amount, based on the volume of said reaction mixture, ranging from 0.3 to 5.0 grams per liter, the reaction temperature being in the range of from about 40° C. to about 60° C., and the reaction time being from about 20 to about 40 hours.

6. In a process for the solution polymerization of acrylonitrile wherein dimethyl sulphoxide is used as the solvent, containing not more than 5 percent by weight of water, and an azobis compound is used as the catalyst, the improvement which comprises adding to the reaction mixture at least one hydroxylamine salt and sulfuric acid, said hydroxylamine salt and sulfuric acid being present in the reaction mixture in amounts ranging from 0.05 gram to 5.0 grams per liter and 0.01 gram to 1 gram per liter, respectively, based on the volume of the reaction mixture, the reaction temperature ranging from about 40° C. to about 60° C. and the reaction time being from about 20 to about 40 hours.

References Cited

UNITED STATES PATENTS

| | | | |
|---|---|---|---|
| 2,858,290 | 10/1958 | Davis et al. | 260—85.5 |
| 2,878,209 | 3/1959 | Jenkins et al. | 260—32.6 |
| 3,094,502 | 6/1963 | Farago | 260—85.5 |
| 3,219,643 | 11/1965 | Uchiyama et al. | 260—85.5 |

JOSEPH L. SCHOFER, *Primary Examiner.*

H. WONG, *Assistant Examiner.*